United States Patent [19]

Byrne et al.

[11] Patent Number: 5,322,640

[45] Date of Patent: Jun. 21, 1994

[54] WATER SOLUBLE CORROSION INHIBITORS

[75] Inventors: Norman E. Byrne, Houston; John D. Johnson, Needville, both of Tex.

[73] Assignee: Nalco Chemical Company, Naperville, Ill.

[21] Appl. No.: 70,598

[22] Filed: Jun. 1, 1993

[51] Int. Cl.$^5$ .................. C23F 11/14; C23F 11/16; C23F 11/167

[52] U.S. Cl. ................. 252/389.22; 252/392; 252/394; 252/395; 422/15; 422/16; 422/17; 548/348.1; 548/350.1; 548/351.1; 548/352.1

[58] Field of Search ............... 422/16, 15, 17; 252/394, 392, 395, 396, 389.23, 389.24, 389.22; 548/351.1, 352.1, 350.1, 348.1

[56] References Cited

U.S. PATENT DOCUMENTS

| | | |
|---|---|---|
| 2,874,074 | 2/1959 | Johnson . |
| 2,995,520 | 8/1961 | Luvisi et al. . |
| 3,514,251 | 5/1970 | Annad et al. . |
| 3,632,396 | 1/1972 | Perez-Zamora . |
| 3,779,935 | 12/1973 | McDougall et al. . |
| 4,189,593 | 2/1980 | Wechsler et al. ............ 548/350.1 |
| 4,215,064 | 7/1980 | Lindemann ............... 548/352.1 |
| 4,362,737 | 12/1982 | Schäfer et al. ............. 548/350.1 |

OTHER PUBLICATIONS

Balanced Amphoteric Surfactants, Eric G. Lomax, Tech. Director, Venture Chemicals, Ltd., London, Soap/Cosmetics/Chemical Specialties, Nov. 1972.

*Primary Examiner*—Robert L. Stoll
*Assistant Examiner*—Valerie Fee
*Attorney, Agent, or Firm*—James J. Drake; Robert A. Miller; Joseph B. Barrett

[57] ABSTRACT

This invention is a method for inhibiting corrosion in metallic flow lines containing hydrocarbon and/or aqueous fluids comprising adding to the fluid contained in the flow line a corrosion inhibiting amount of a water-soluble ampholytic substituted imidazoline having the formula:

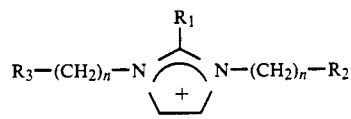

wherein R1 comprises a radical selected from the group consisting of hydrogen, alkyl, and aryl groups having 6 to 30 carbons; R2 comprises a radical selected from the group consisting of polyalkylene polyamines having from 2 to 16 carbon atoms, $NH_2$, $N(R_4)_2$, OH and SH; R3 is a radical selected from the group consisting of carboxylate, carbonate, sulfite, sulfate, phosphite, and phosphate; n is a number from 1 to 10; and, R4 comprises a branched or linear alkyl chain having a length of 1 to 8.

18 Claims, 3 Drawing Sheets

WATER SOLUBLE CORROSION INHIBITORS

BACKGROUND OF THE INVENTION

1. Field of the Invention

The invention relates to a method for inhibiting corrosion in metallic flow lines and, more specifically, to an imidazoline compound for use as an corrosion inhibitor in metallic flow lines.

2. Description of the Prior Art

Flow-induced localized corrosion (FILC) is a result of high shear conditions present in flow lines. The amount of corrosion that occurs is dependent on a variety of factors including the corrosiveness of the fluid flowing through the lines, the metallurgy of the line and the ability of added corrosion inhibitors to maintain adhesion to the interior of the line.

The ability of added corrosion inhibitors to maintain adhesion to the interior of the line depends on both the chemical adhesive properties of the inhibitor and the shear stress conditions which exist inside the line. A number of products have shown promise as shear-resistant corrosion inhibitors. Included among the corrosion inhibitors are amides and quaternized amines and amide amine salts.

While the compounds listed above have shown good adhesion characteristics, these characteristics diminish when presented with the high flow velocities present in commercial flow lines. As a result, a corrosion inhibitor with good adhesive qualities under high shear stress conditions is needed.

SUMMARY OF THE INVENTION

This invention is a method for inhibiting corrosion in metallic flow lines containing corrosion causing hydrocarbon fluids and/or aqueous fluids comprising adding to the fluid contained in the flow line a corrosion inhibiting amount of a water-soluble or water dispersible ampholytic substituted imidazoline having the formula:

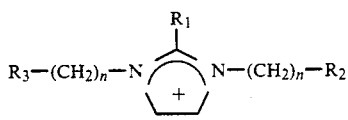

wherein $R_1$ comprises a radical selected from the group consisting of hydrogen, alkyl and aryl groups; $R_2$ comprises a radical selected from the group consisting of polyalkylene polyamines having a length of 2 to 16 carbons, $NH_2$, $N(R_4)_2$, $OH$ and $SH$, $R_3$ is a radical selected from the group consisting of carboxylate, carbonate, sulfite, sulfate, phosphite and phosphate; n is a number from 1 to 10; and, $R_4$ comprises a branched or linear alkyl chain having a length of 1 to 8 carbons. Preferably, $R_4$ is a branched or linear alkyl chain having a length of 1 to 5 carbons.

The invention relates to an ampholytic, substituted imidazoline used to inhibit corrosion in large diameter flow lines (LDFs) in oil field applications. Pipelines in these applications are used to transport large volumes of produced oil and water at extremely high flow rates from the field to the processing stations. These lines may vary in size from one inch to four feet in diameter. Water-soluble corrosion inhibitors are necessary to prevent corrosion, i.e., general attack and/or pitting, of the pipe walls, joints, pumps and collection stations. The imidazoline material is designed to be water soluble and is intended for continuous treatment, although batch treatment is also possible. Specifically, the ampholytic imidazoline inhibitor comprises the following formula:

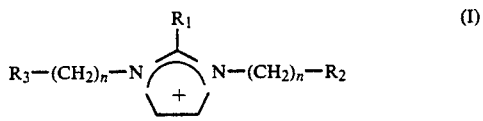

wherein $R_1$ comprises a radical selected from the group consisting of hydrogen, alkyl and aryl groups, $R_2$ comprises a radical selected from the group consisting of polyalkylene polyamines having a length of 2 to 16 carbons, $NH_2$, $N(R_4)_2$, $OH$ and $SH$, $R_3$ is a radical selected from the group consisting of carboxylate, carbonate, sulfite, sulfate, phosphite and phosphate; n is a number from 1 to 10; and, $R_4$ comprises a branched or linear alkyl chain having a length of 1 to 8 carbons. Preferably, $R_4$ is a branched or linear alkyl chain having a length of 1 to 5 carbons.

DESCRIPTION OF THE PREFERRED EMBODIMENTS

Figure 1:
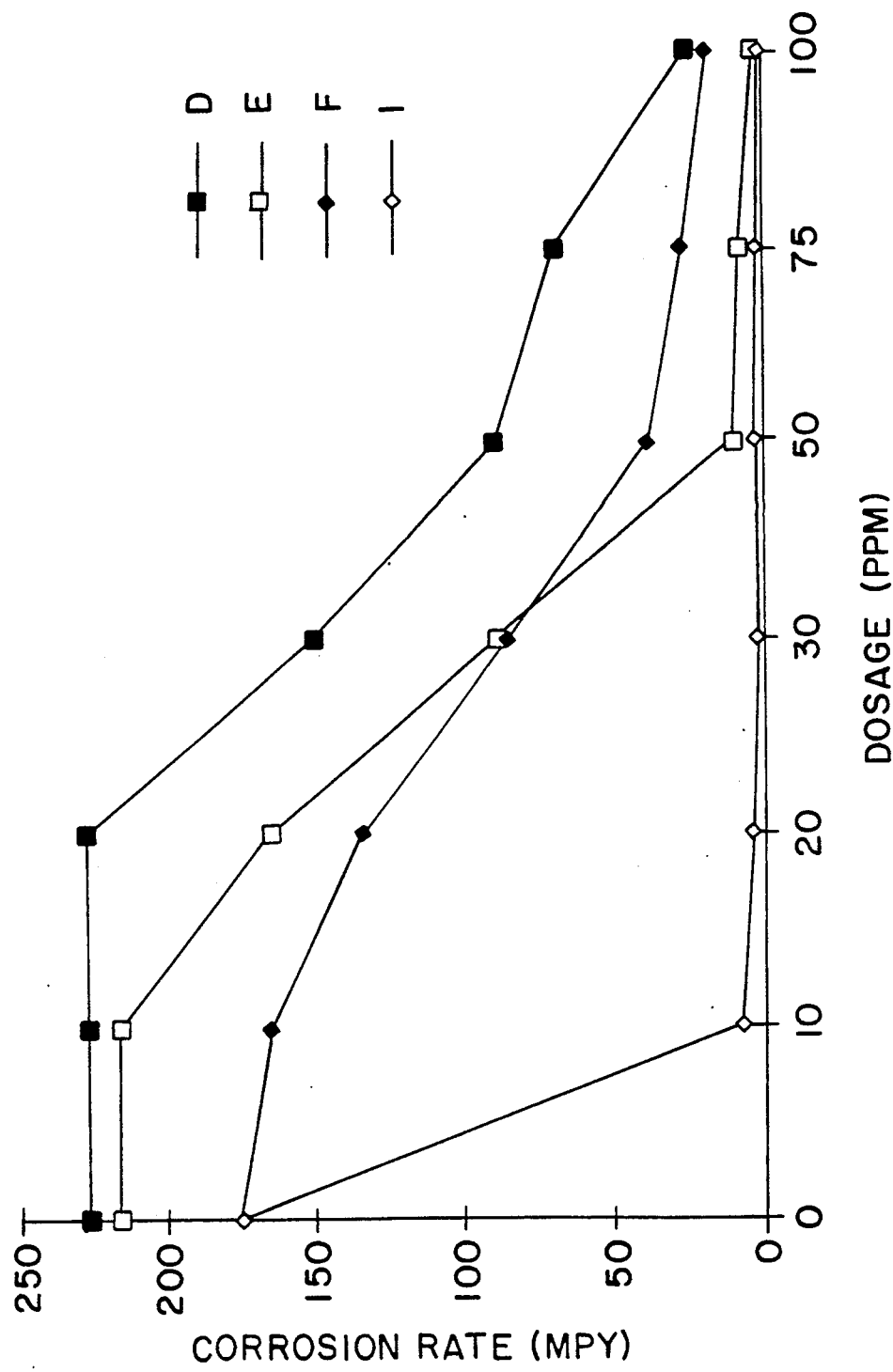
FIG. 1 is a graph comparing corrosion rates of the imidazoline inhibitor in a stirred kettle apparatus to other inhibitors.

The formation of imidazolines is well known in the art. The imidazoline inhibitor of the invention may be formed as described in U.S. Pat. No. 2,874,074 issued to Johnson, the disclosure of which is hereinafter incorporated by reference. Further methods for the synthesis and preparation of the imidazoline inhibitor of the invention may be found in U.S. Pat. No. 2,957,003 issued to Johnson, the disclosure of which is also hereinafter incorporated by reference. The addition of substituents to the basic imidazoline structure is disclosed in U.S. Pat. No. 2,995,520 issued to Luvisi, et. al., the disclosure of which is hereinafter incorporated by reference.

The imidazoline inhibitor (I) of this invention may preferably be synthesized by reacting an imidazoline (II) with acrylic acid (III) as shown in the formula below.

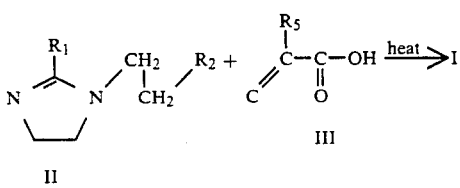

wherein $R_5$ is H or $CH_3$. $R_1$ and $R_2$ have the same meanings as set forth in Formula I.

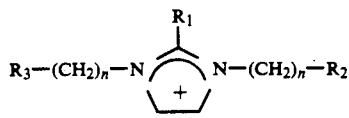

(I)

wherein $R_1$ comprises a radical selected from the group consisting of hydrogen, alkyl and aryl groups; $R_2$ comprises a radical selected from the group consisting of polyalkylene polyamines having a length of 2 to 16 carbons, preferably including ethylene diamine, diethylene triamine, triethylene tetramine and tetraethylene pentamine, $NH_2$, $N(R_4)_2$, OH and SH; $R_3$ is a radical selected from the group consisting of carboxylate carbonate, sulfite, sulfate, phosphite and phosphate; n is a number from 1 to 10; and $R_4$ comprises a branched or linear alkyl chain having a length of 1 to 8 carbons. Preferably, $R_4$ is a branched or linear alkyl chain having a length of 1 to 5 carbons. The alkyl groups comprising $R_1$ have a preferred chain length of 6 to 30 carbons. A more preferred chain length is 10 to 26 carbons. The most preferred chain length is 14 to 22 carbons. Preferred aryl groups are phenyls, tolyls and dodecyl benzene.

The imidazoline of this invention has been shown to be extremely effective for inhibiting mild steel corrosion, as well as corrosion of other types of metallurgy, in hydrocarbon, oil/brine mixtures and aqueous systems under a variety of conditions. The inhibitor is most successful on so-called sweet systems, or systems having a high $CO_2$ content. However, use of the compound in systems having sour conditions, i.e., high $H_2S$ content, is also acceptable. Although fluid content of the flow lines may vary, the imidazoline inhibitor of the claims may be used in a variety of environments. Oil cuts in the field can range from less than 1% (oil field) to 100% (refinery) oil, while the nature of the water can range from 0–300,000 ppm TDS (total dissolved solids). In addition, this material would not only be useful in the large diameter flow lines (LDFs), i.e., from one inch to four feet in diameter, but also would work in small gathering lines, small flow lines and headers. In the preferred method, the imidazoline inhibitor is added at any point in the flow line upflow from the point at which corrosion prevention is desired.

In practice, the imidazoline inhibitor is preferably added to the flow line continuously to maintain a corrosion inhibiting dose of from 0.01–5,000 ppm. More preferably, the corrosion inhibiting dose is from 0.1–500 ppm. In the most preferred embodiment of the invention, the corrosion inhibiting dose is from 1–250 ppm. Although a most preferred use of the compound in the claimed method is for metallic flow lines comprising mild steel, it is believed that the inhibitor is also effective in inhibiting the corrosion in other types of metallurgy. In certain cases, batch treatments are the method of choice for application of the imidazoline inhibitor. Dosage rates for batch treatment range from 0.1 to 50,000 ppm. In the preferred embodiment of the invention, the flow rate of the flow line in which the imidazoline inhibitor is used is between 0 to 65 feet per second. A more preferred flow rate is between 0.1 to 40 feet per second.

In some cases, the imidazoline may be formulated in water in order to facilitate addition to a flow line. It is believed that the imidazoline may hydrolyze to produce the amide amine. It is believed that a mixture of the imidazoline and the hydrolysis products may exist in equilibrium. It is further believed that all of these materials still perform and do not decrease the product's performance.

EXAMPLES

Example 1

800 g. (2.2 moles) of imidazoline was added to a 1.5 liter resin kettle which was wrapped with heating tape. The kettle was equipped with a four neck removable top which was fitted with an overhead stirrer, a thermocouple and a condenser. The solution was stirred (250 rpm) and heated to 70° C. 166.16 g. of acrylic acid (2.304 moles, 1.05 e.g.) was then added via a dropping funnel over a period of five minutes. The reaction products exothermed to 90° C., and then the solution was heated to 120° C. for two hours. The solution was cooled to 80° C. and then 241.54 g. of 2-propanol was added. The solution was stirred until homogeneous and was then bottled. The product is hereinafter referred to as Example 1.

Example II

Several corrosion tests were performed with the imidazoline inhibitor of Example 1 in a so called "stirred kettle" apparatus which measured corrosion inhibition under several different fluid flow rates.

The stirred kettle apparatus used consisted of a one liter resin kettle with a four neck removable top. An overhead stirrer was used to agitate the fluids and a sparge tube is used to purge the fluids with $_2$ and to remove any $O_2$. A thermocouple and temperature controller were used to monitor/maintain the temperature of the system. The fluids used for the tests consisted of varying ratios of 5% NaCl solution (brine) and a mineral oil or kerosene. A baseline corrosion rate was measured, and the system was then dosed with the corrosion inhibitor. Corrosion rates were measured using a probe with two electrodes (reference and working). The probes were connected to a Corrater ® (Rohrback Instruments, Santa Fe Springs, Calif.), which recorded corrosion rates at periodic intervals. The Corrater ® used the method of linear polarization (LPR) to determine corrosion rates. The data was then downloaded to a spreadsheet software program which allowed graphical interpretation of the results. FIG. 1 illustrates the data from a test using the stirred kettle technique (low shear stress conditions). The imidazoline of Example 1 provided much greater inhibition at significantly lower dosages than compounds it was tested against. Compounds D, E and F are an imidazoline aryl sulfonic acid salt, an acrylamine oxide and a quaternized alkyl pyridine ($C_6H_{13}$), respectively. All concentrations/dosages were identical.

Example III

Testing of the imidazoline Example 1 inhibitor of the invention was also accomplished using a flow loop (high shear stress conditions). The flow loop utilized was a closed loop of 1"316L SS (stainless steel) which held a total of 14 gallons of fluid. capable of measuring corrosion rates of mild steel coupons under high flow conditions (high shear stress). Testing of the chemical is possible at three different flow rates simultaneously using flow control valves.

Figure 2:
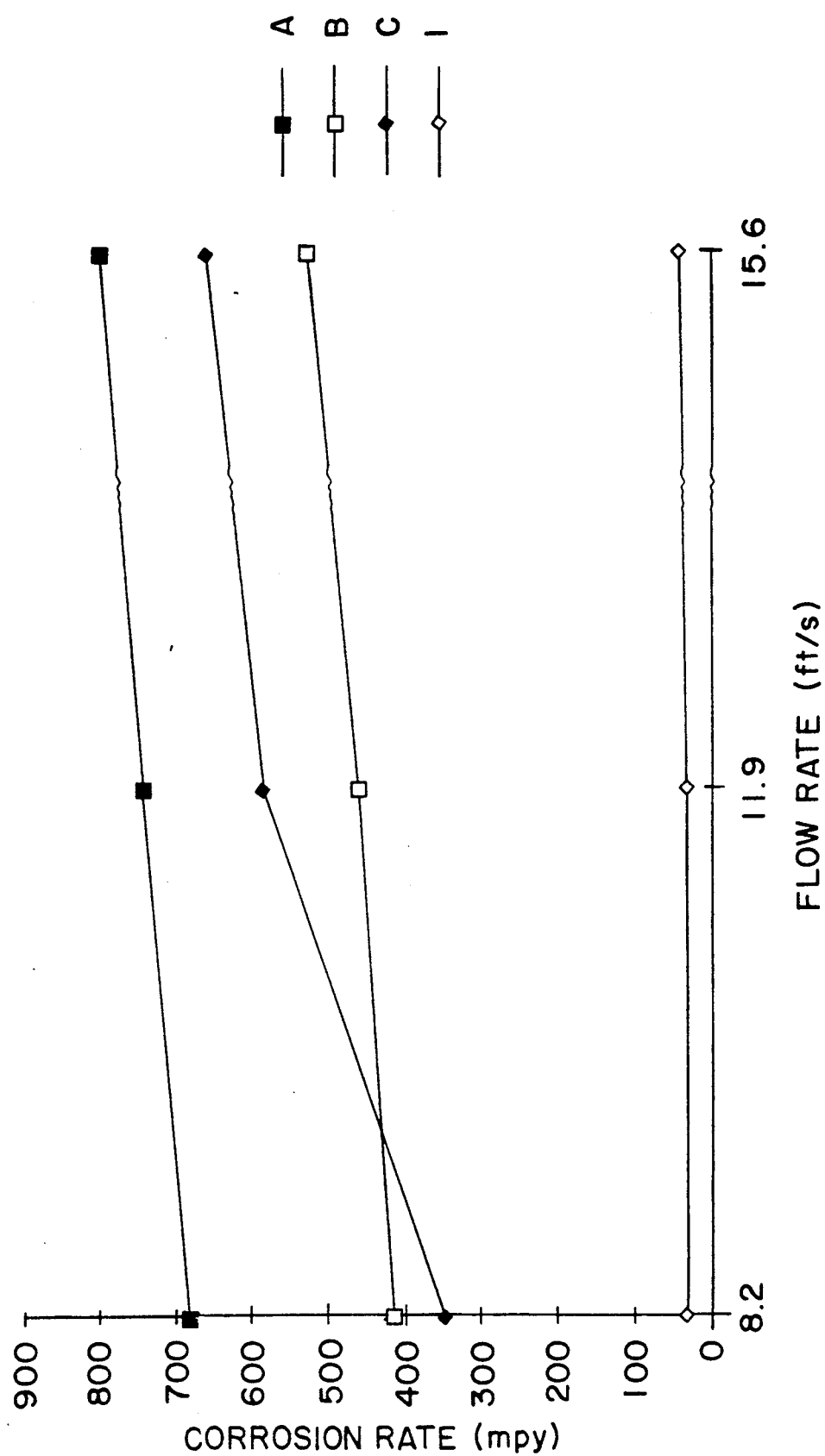
FIG. 2 is a graph comparing corrosion rates of the imidazoline inhibitor in a flow loop apparatus to other inhibitors.

At three different flow rates using the flow loop test, the imidazoline of Example 1 showed a dramatic increase in performance over both a blank and several known corrosion inhibitors which are commonly used for the prevention of corrosion in pipeline systems (FIG. 2). Compound A is the reaction product of tetraethylene pentamine (TEPA), pentethylene hexamine (PEHA) or hexethylene heptamine (HEHA) and an epichlorohydrin capped alcohol wherein the alcohol is one such as the Alfol 610 alcohol manufactured by Vista Chemicals of Austin, Tex. Compound B is a mixture of a benzyl chloride quaternized imidazoline and an alkyl pyridine wherein the alkyl group is a methyl, ethyl or disbustituted group. Compound C is an amide amine salt which is the reaction product of PEHA or tall oil fatty acids (TOFA) and an acetic acid salt. The imidazoline of Example 1 outperformed the other inhibitors listed at all flow rates. This is a significant point since many compounds are able to inhibit corrosion at low or stagnant flow rates, but fail at higher flow rates because they are stripped from the metal.

Example IV

Figure 3:
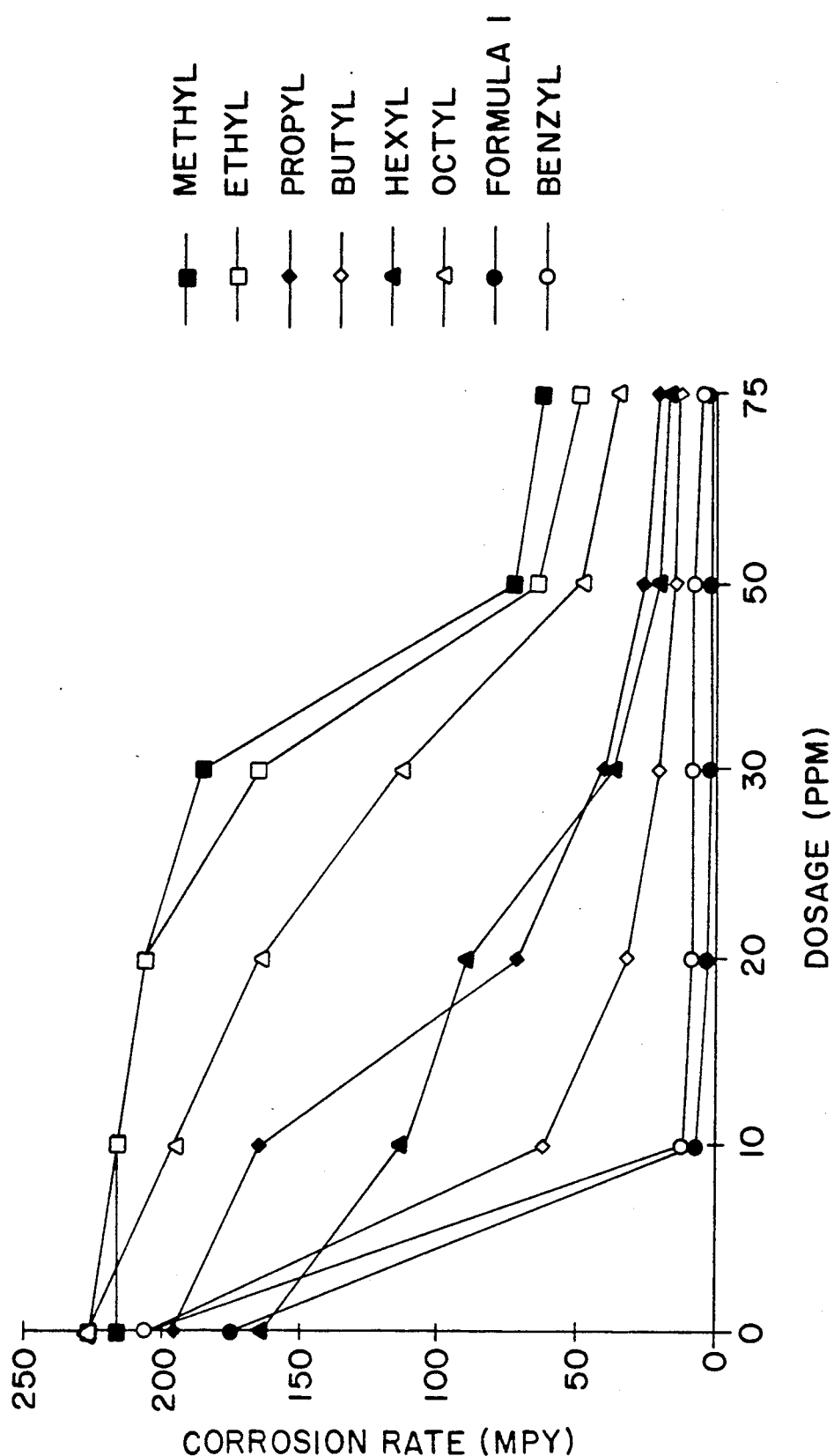
FIG. 3 is a graph comparing imidazoline inhibitor in a stirred kettle apparatus to other inhibitors.

Utilizing the stirred kettle apparatus discussed in Example II above, a comparison was made between the imidazoline inhibitor of Example 1 and several imidazoline compounds having varying carbon chain lengths. FIG. 3 illustrates the data collected from the comparison. The imidazoline of Example 1 provided greater inhibition at lower dosages than compounds it was tested against. Further, it was shown that imidazolines having medium carbon chain lengths, i.e., 3 to 6 carbons, showed better results than very short, i.e., methyl and ethyl, carbon chains, or longer, i.e., octyl, carbon chains.

As can be seen from the above data, the new inhibitor not only maintains its effectiveness from low to very high shear stress conditions, but it is also able to do so at lower dosages than other inhibitors used for the reduction of corrosion in flow lines. The imidazoline of the invention is also effective for inhibiting the corrosion of various metals in contact with refinery and chemical process streams.

The imidazoline may be used alone or in combination with other compounds. A formulation which has been found to give the best performance is as follows:

The above formulation is created by blending all of the ingredients into a homogeneous mixture. A preferred order of addition is as follows, (a) imidazoline/acrylic acid adduct (b) methanol or isopropanol, (c) alkyl pyridines-benzyl chloride quat wherein the alkyl group is a methyl, ethyl or disbustituted group, ethoxylated alkyl having a carbon length from $C_{10}$ to $C_{30}$ and having 20 moles of ethylene oxide per mole of amine, water and p-toluenesulfonic acid. The order of addition is not critical to the invention as long as the resulting mixture is homogeneous. The preferred formulation as a composition as follows:

| Compound | % By Weight |
|---|---|
| water | 10–60 |
| methanol | 5–30 |
| isopropanol | 5–30 |
| p-toluenesulfonic acid | 0–5 |
| ethoxylated alkyl amine (surfactant) | 2–15 |
| imidazoline/acrylic acid adduct (Example I added heat) | 5–50 |
| alkyl pyridines-benzyl chloride quat | 0–15 |

Typical formulations of the imidazoline of the invention may use other alcohols and glycols as pour point depressants or surfactants, such as ethoxylated nonyl phenols and/or ethoxylated amines as wetting agents or additives for dispersing the imidazoline into the stream into which it is added. Typical alcohols are $C_1$–$C_3$ lower or branched alkyl groups and are used as pour point depressants. Useful glycols include ethylene and propylene glycols and are also used as pour point depressants. Surfactants utilized should be water soluble and allow the product to better wet the surface of the flow line where corrosion may take place. Water soluble surfactants utilized may be non-ionic, cationic, or anionic and will generally have a hydrophylic lipophylic balance (HLB) value of 1. Oil soluble surfactants may be utilized if it is desired to disperse the imidazoline composition into a hydrocarbon fluid. Oil soluble surfactants may be nonionic, cationic or anionic. These surfactants typically have an HLB value less than 7. When the ethoxylated amines or nonyl phenols are reacted, they typically contain from 10–20 moles of ethylene oxide per mole of amine or nonyl phenol. Most preferably, the ratio is 20 moles of ethylene oxide to each mole of amine or nonyl phenol.

Other compounds which may be blended with the imidazoline are quaternary amines, such as fatty, cyclic or aromatic amines quaternized with lower alkyl halides (e.g. methyl chloride) or benzyl chloride and certain amides, such as polyethylene polyamines/TOFA amides, salted with low MW acids (i.e., acetic, HCl, hydroxy acetic), which are used as co-inhibitors. In addition, formulations including the imidazoline inhibitor may include filming agents such as p-toluenesulfonic acid and dodecyl benzene sulfonic acid.

What is claimed is:

1. A method for inhibiting corrosion in metallic flow lines comprising adding to the fluid contained in the flow line a corrosion inhibiting amount of a water-soluble ampholytic substituted imidazoline having the formula:

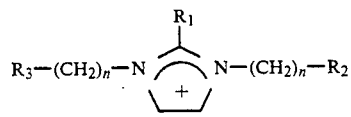

wherein $R_1$ comprises radical selected from the group consisting of hydrogen, alkyl and aryl groups having 6 to 30 carbons; $R_2$ comprises radical selected from the group consisting of polyalkylene polyamines having from 2 to 16 carbon atoms, $NH_2$, $N(R_4)_2$, OH and SH, $R_3$ is a radical selected from the group consisting of carboxylate, carbonate, sulfite, sulfate, phosphite and phosphate; n is a number from 1 to 10; and, $R_4$ comprises a branched or linear alkyl chain having a length of 1 to 8 carbons.

2. The method of claim 1, wherein the imidazoline is added to the flow line continuously to maintain a corrosion inhibiting dose of from 0.01 to 5,000 parts per million.

3. The method of claim 2, wherein the imidazoline is added to the flow line continuously to maintain a corrosion inhibiting dose of from 0.1 to 500 parts per million.

4. The method of claim 3, wherein the imidazoline is added to the flow line continuously to maintain a corrosion inhibiting dose of from 1 to 250 parts per million.

5. The method of claim 1, wherein the flow line is comprised of mild steel.

6. The method of claim 1, wherein $R_1$ comprises an alkyl group having 10 to 26 carbons.

7. The method of claim 6, wherein $R_1$ comprises an alkyl group having 14 to 22 carbons.

8. The method of claim 1, wherein $R_1$ comprises an aryl group selected from the group comprising phenyls, tolyls and dodecyl benzene.

9. The method of claim 1, wherein the flow rate of fluid through the flow line is from 0 to 65 feet per second.

10. The method of claim 9, wherein the flow rate of fluid through the flow line is from 0 to 40 feet per second.

11. The method of claim 10, wherein the flow rate of fluid through the flow line is from 0 to 35 feet per second.

12. A corrosion inhibitor composition for metallic flow lines, comprising:

a) an ampholytic, water-soluble substituted imidazoline having the formula:

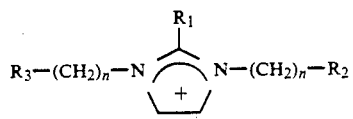

wherein $R_1$ comprises a radical selected from the group consisting of hydrogen, alkyl and aryl groups, $R_2$ comprises a radical selected from the group consisting of polyethylene polyamines, $NH_2$, $N(R_4)_2$, OH and SH; $R_3$ is a radical selected from the group consisting of carboxylate, carbonate, sulfite, sulfate, phosphite, and phosphate and; n is a number from 1 to 10; and, $R_4$ comprises a branched or linear alkyl chain having a length of 1 to 8 carbons;

b) a water soluble surfactant; and c) water.

13. The composition of claim 12, wherein the surfactant is selected from the group comprising an ethoxylated alkyl amine or an ethoxylated nonyl phenol.

14. The composition of claim 12, further including a pour point depressant selected from the group comprising alcohols and glycols.

15. The composition of claim 12, further including a co-inhibitor selected from the group comprising amides, quaternized amines and amide amine salts.

16. The composition of claim 12, further including a filming agent selected from the group comprising agent p-toluene sulfonic acid and dodecyl benzene sulfonic acid.

17. A method for inhibiting corrosion in metallic flow lines comprising adding to the fluid contained in the flow line a) a corrosion inhibiting amount of a water-soluble ampholytic substituted imidazoline having the formula:

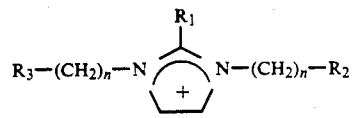

wherein $R_1$ comprises a radical selected from the group consisting of hydrogen, an alkyl group having 14 to 22 carbons, an aryl group selected from the group comprising phenyls, tolyls and dodecyl benzene; $R_2$ comprises a radical selected from the group consisting of polyalkylene polyamines having from 2 to 16 carbon atoms, $NH_2$, $N(R_4)_2$, OH and SH, $R_3$ is a radical selected from the group consisting of carboxylate, carbonate, sulfite, sulfate, phosphite and phosphate; n is a number from 1 to 10; and, $R_4$ comprises a branched or linear alkyl chain having a length of 1 to 8 carbons; and wherein the imidazoline is added to the flow line continuously to maintain a corrosion inhibiting dose of from 1 to 250 parts per million.

18. A corrosion inhibitor composition for metallic flow lines, comprising:

a) an ampholytic, water-soluble substituted imidazoline having the formula:

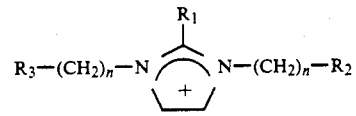

wherein $R_1$ comprises a radical selected from the group consisting of hydrogen, alkyl and aryl groups, $R_2$ comprises a radical selected from the group consisting of polyethylene polyamines, $NH_2$, $N(R_4)_2$, OH and SH; $R_3$ is a radical selected from the group consisting of carboxylate, carbonate, sulfite, sulfate, phosphite and phosphate; and n is a number from 1 to 10; and, $R_4$ comprises a branched or linear alkyl chain having a length of 1 to 8;

b) a water-soluble surfactant selected from the group comprising an ethoxylated alkyl amine or an ethoxylated nonyl phenol;

c) a pour point depressant selected from the group comprising alcohols and glycols;

d) a co-inhibitor selected from the group comprising amides, quaternized amines and amide amine salts;

e) a filming agent selected from the group comprising agent p-toluene sulfonic acid and dodecyl benzene sulfonic acid;

f) water.

* * * * *